(12) United States Patent
Sautter et al.

(10) Patent No.: US 8,235,266 B2
(45) Date of Patent: Aug. 7, 2012

(54) RACK STRAP EXTENSION SYSTEMS FOR VEHICLE BIKE RACKS

(75) Inventors: Chris Sautter, Portland, OR (US); Mike Kemery, Portland, OR (US); Zac Elder, Portland, OR (US)

(73) Assignee: Yakima Products, Inc., Beaverton, OR (US)

( * ) Notice: Subject to any disclaimer, the term of this patent is extended or adjusted under 35 U.S.C. 154(b) by 590 days.

(21) Appl. No.: 12/391,202

(22) Filed: Feb. 23, 2009

(65) Prior Publication Data

US 2009/0321488 A1    Dec. 31, 2009

Related U.S. Application Data

(60) Provisional application No. 61/066,689, filed on Feb. 21, 2008.

(51) Int. Cl.
*B60R 9/06* (2006.01)
(52) U.S. Cl. ......... 224/493; 224/572; 224/511; 224/517
(58) Field of Classification Search .................. 224/572, 224/43, 511, 517
See application file for complete search history.

(56) References Cited

U.S. PATENT DOCUMENTS

| | | | | |
|---|---|---|---|---|
| 3,927,810 A * | 12/1975 | Danon | .......................... | 224/314 |
| 4,077,554 A * | 3/1978 | Goode | .......................... | 224/559 |
| 4,171,077 A * | 10/1979 | Richard, Jr. | .................... | 224/500 |
| 4,265,382 A * | 5/1981 | Edwards | ........................ | 224/320 |
| 4,463,983 A * | 8/1984 | Hellriegel | ...................... | 296/213 |
| 4,676,413 A * | 6/1987 | Began et al. | ................... | 224/532 |
| 4,887,754 A | 12/1989 | Boyer | | |
| 4,997,116 A | 3/1991 | Grim | | |
| 5,137,195 A * | 8/1992 | Walter | .......................... | 224/315 |
| 5,292,045 A * | 3/1994 | Mandel | ......................... | 224/309 |
| 5,369,970 A * | 12/1994 | Voiculescu et al. | .............. | 70/240 |
| 5,423,644 A * | 6/1995 | First, Sr. | ........................ | 410/100 |
| 5,553,718 A * | 9/1996 | Robar | .............................. | 211/18 |
| 5,573,165 A * | 11/1996 | Bloemer et al. | ............... | 224/523 |
| 5,598,959 A | 2/1997 | Lorensen | | |
| 5,658,119 A * | 8/1997 | Allsop et al. | ................... | 414/462 |
| 5,713,498 A * | 2/1998 | Cucci | ............................. | 224/328 |
| 5,738,258 A * | 4/1998 | Farrow et al. | .................. | 224/324 |
| 5,829,654 A * | 11/1998 | Weger et al. | ................... | 224/322 |
| 5,884,824 A * | 3/1999 | Spring, Jr. | ...................... | 224/310 |
| 6,045,022 A * | 4/2000 | Giles | ............................. | 224/532 |
| 6,286,738 B1 | 9/2001 | Robins | | |

(Continued)

FOREIGN PATENT DOCUMENTS

EP    792771 A2 *  9/1997

*Primary Examiner* — Brian D Nash
(74) *Attorney, Agent, or Firm* — Kolisch Hartwell, P.C.

(57) ABSTRACT

Rack system for a vehicle including a vehicle body forming an edge and also including a body accessory forming a protrusion on the vehicle body. The rack system may comprise a trunk rack configured to be positioned adjacent a rear end of the vehicle. The rack system also may comprise a strap assembly connected or connectable to the trunk rack. The strap assembly may be configured to extend over the protrusion and engage the edge of the vehicle body, to form a connection between the trunk rack and the vehicle. The strap assembly may include a strap and a spanning member. The spanning member may be configured to span the protrusion and support the strap in a spaced relation to the protrusion, such that the strap assembly can be tensioned without applying pressure to the protrusion.

19 Claims, 4 Drawing Sheets

U.S. PATENT DOCUMENTS

| | | |
|---|---|---|
| 6,308,874 B1 * | 10/2001 | Kim et al. ............. 224/310 |
| 6,336,580 B1 | 1/2002 | Allen |
| 6,386,407 B1 | 5/2002 | Erickson |
| 6,422,441 B1 | 7/2002 | Settelmayer |
| 6,422,443 B1 | 7/2002 | Erickson |
| 6,431,423 B1 | 8/2002 | Allen |
| 6,561,398 B1 | 5/2003 | Cole |
| 6,976,615 B2 | 12/2005 | Dean |
| 7,036,698 B2 | 5/2006 | Allen |
| 2002/0117524 A1 * | 8/2002 | Jeong ............. 224/314 |
| 2010/0127031 A1 * | 5/2010 | Sautter et al. ............. 224/500 |

* cited by examiner

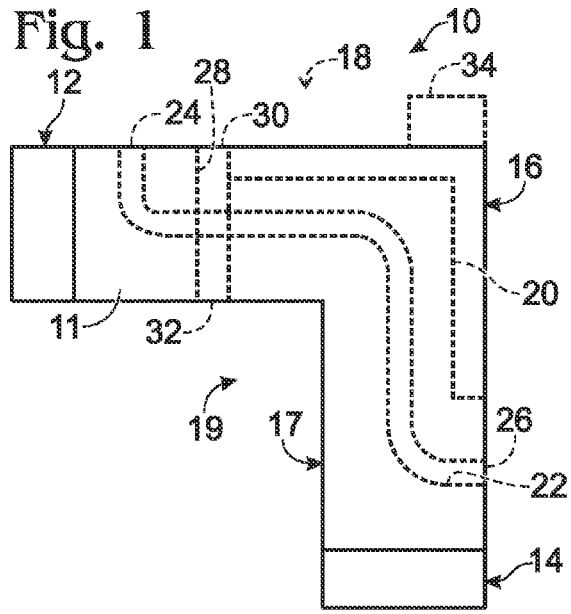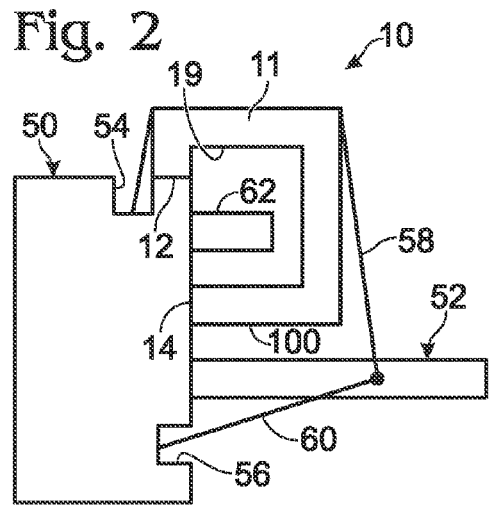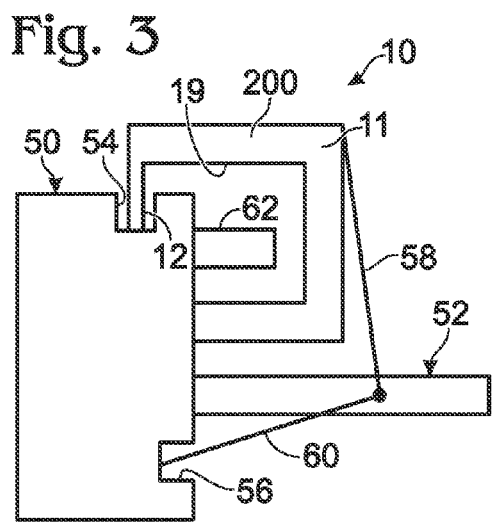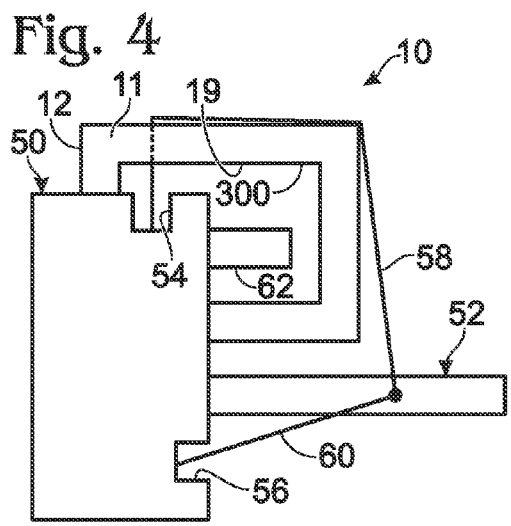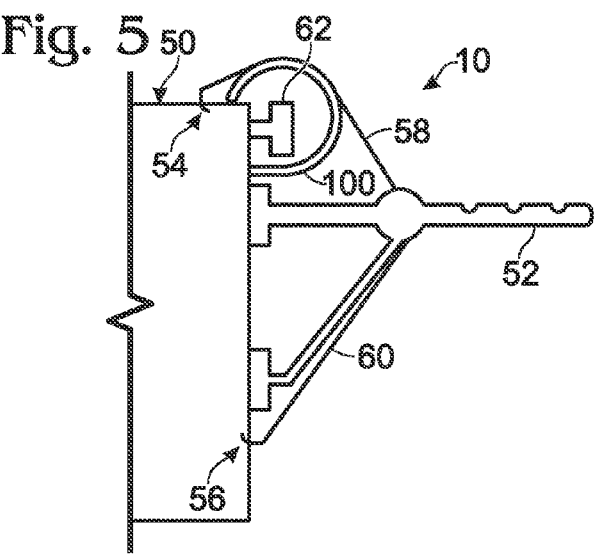

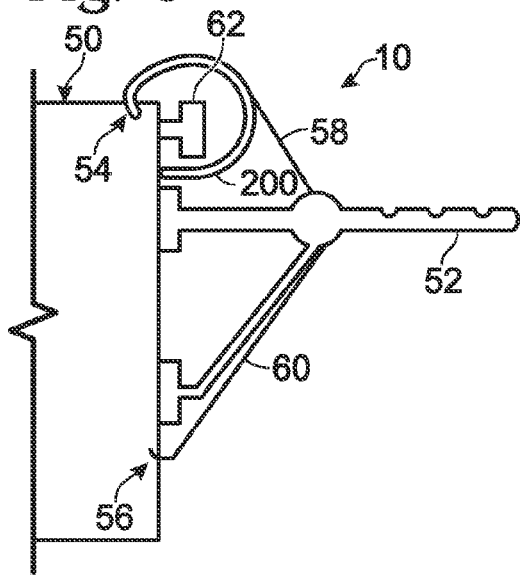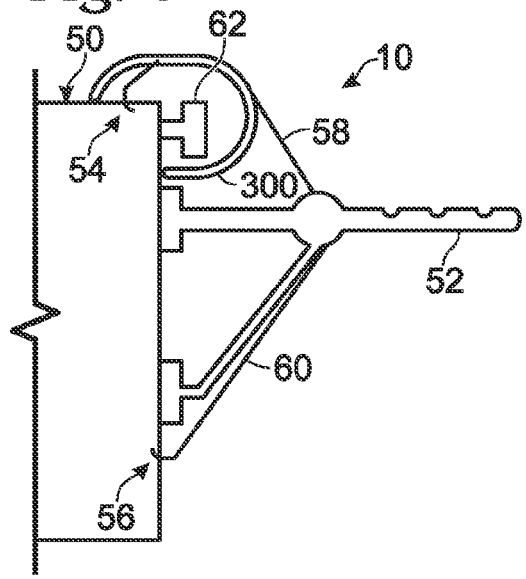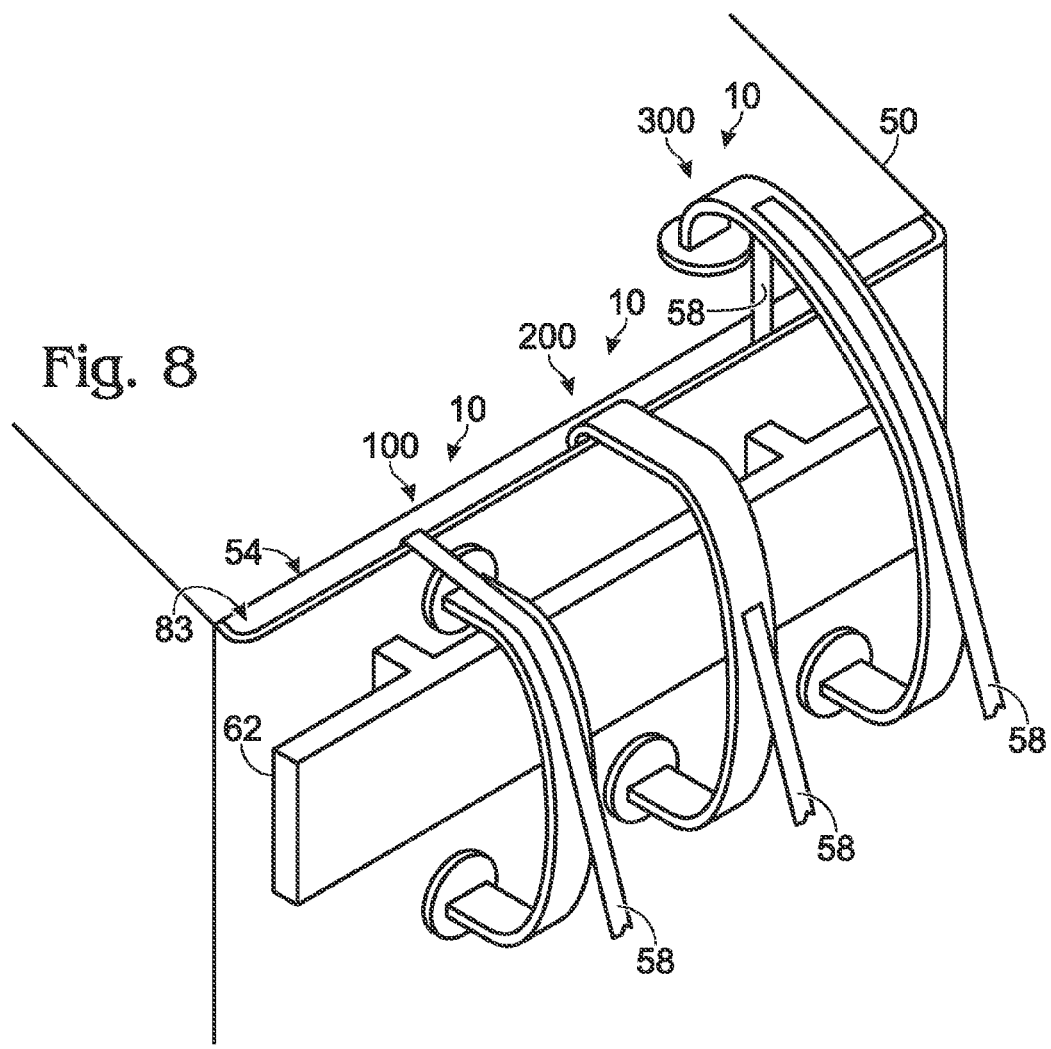

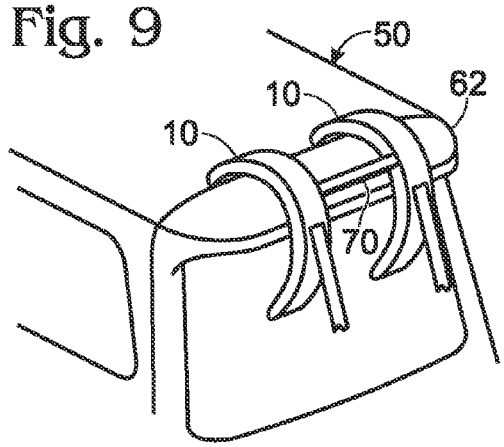
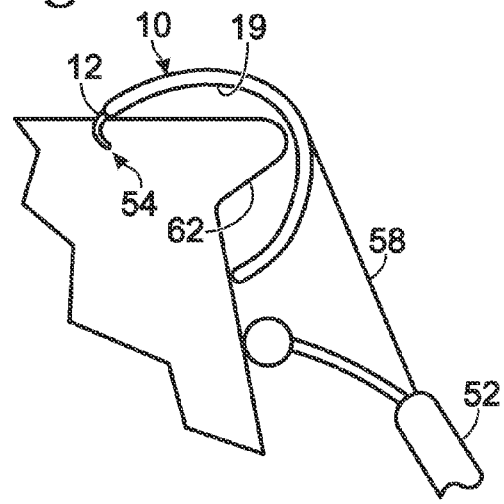
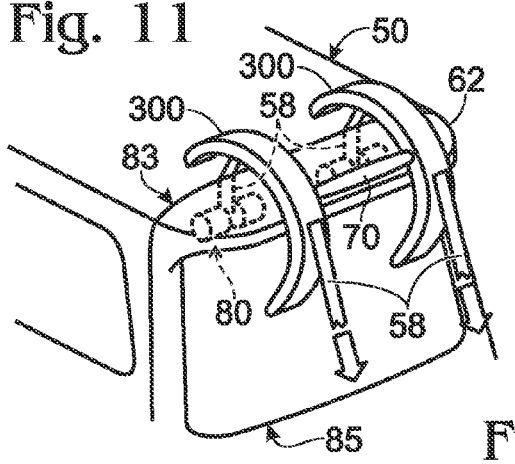
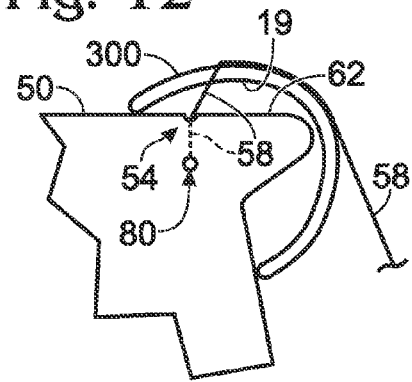
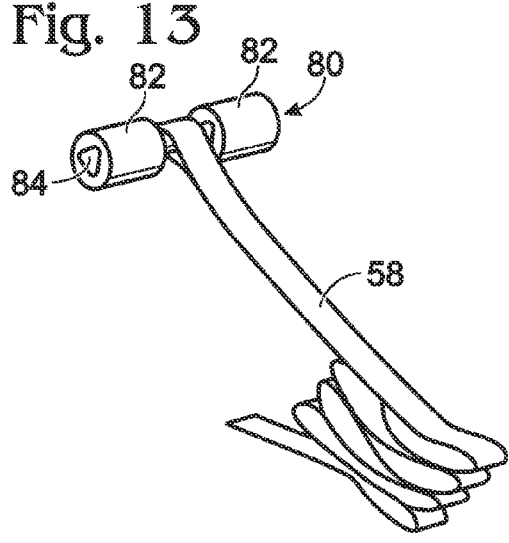
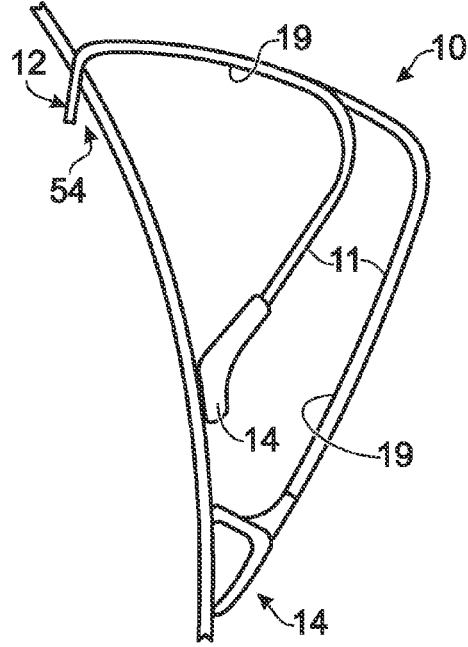

RACK STRAP EXTENSION SYSTEMS FOR VEHICLE BIKE RACKS

CROSS-REFERENCE TO RELATED APPLICATION

This application claims priority from U.S. Provisional Patent Application Ser. No. 61/066,689, filed Feb. 21, 2008 which is incorporated herein by reference.

BACKGROUND

The present disclosure relates to rack strap extension systems including vehicle-body-accessory spanning members for vehicle racks and methods for using the same.

Vehicle bike racks, or carriers, come in various configurations. For example, a common type of vehicle bike rack is described as a trunk rack and may be configured for installation at the rear of a vehicle, such as on, near, or adjacent the trunk of a sedan-type vehicle, or on, near, or adjacent the rear door of a hatchback- or minivan-type vehicle. Though generally described as trunk racks, they are not limited to being installed on vehicles with trunks. Often, a trunk rack is adjustable so that it can be configured to fit various vehicle types including both sedan- and hatchback-type vehicles. Trunk racks are generally installed using a series of straps, or webbing, that is secured to various points on the vehicle, such as one or more seams between a trunk or rear door and an adjacent portion of the vehicle's body, between a hinged window and an adjacent portion of a vehicle's body, or on another part of a vehicle body, such as an edge of a bumper. These straps are generally provided with a mechanism to tension the straps to secure the rack to the vehicle. The addition of one or more bikes or other equipment to the rack adds further tension to one or more of the straps. For example, Yakima sells a line of trunk racks under the YAKIMA JOE brand. Non-exclusive examples of trunk racks are also found in U.S. Pat. Nos. 4,997,116; 6,286,738; 6,386,407; and 6,422,443, which are incorporated herein by reference.

It is increasingly common for modern vehicles to include various aesthetic and/or functional body accessories or protrusions, such as (but not limited to) spoilers, fins, wings, ground effects, and the like. Such body accessories or protrusions may be designed, manufactured, and installed by the original vehicle manufacturer (i.e., the original equipment manufacturer or OEM), or they may be after-market products installed by the vehicle owner or a technician. Often, such body accessories or protrusions are non-structural, for example being constructed of nonstructural plastic. That is, they are often not designed to bear weight or to withstand forces other than typical wind forces created by normal driving conditions. Non-exclusive examples of vehicles that include OEM body accessories or protrusions on or adjacent the hatchback door of the vehicle include the 2008 MINI COOPER S manufactured by BMW and the 2005 SUBARU FORESTER 2.5 XT, both of which include what may be described as spoilers or fins.

Vehicles having non-structural body accessories or protrusions on, near, or adjacent the rear of a vehicle often interfere or prevent the use of a typical trunk rack because the straps used to secure the rack to the vehicle, when tensioned, would impart excessive forces to the body accessory or protrusion. For example, a vehicle-body accessory or protrusion in the form of a spoiler adjacent the top portion of the vehicle's rear door would be subjected to forces from a tensioned strap that secures the trunk rack to the vehicle, and that force imparted from the strap may damage the vehicle-body accessory or protrusion.

SUMMARY

Vehicle-body-accessory spanning members of a rack strap extension system that provide an extension mechanism for vehicle bike racks and vehicle bike racks incorporating the same according to the present disclosure include one or more members configured to span a body accessory or protrusion such as (but not limited to) a spoiler, fin, or wing that is installed proximate a strap securing point of a vehicle. The spanning members may be described as providing a mechanism for routing the straps of a vehicle bike rack around a vehicle-body accessory or protrusion. Additionally or alternatively, the spanning members may be described as preventing excessive forces from being applied to a vehicle-body accessory by a strap, or webbing, of a vehicle bike rack.

BRIEF DESCRIPTION OF THE DRAWINGS

FIG. 1 is a schematic side-view illustration of a vehicle-body accessory spanning member according to the present disclosure.

FIG. 2 is a schematic side-view illustration of a vehicle having a vehicle-body accessory or protrusion, a trunk rack, and a vehicle-body-accessory spanning member according to the present disclosure, the rack and spanning member schematically shown installed on the vehicle.

FIG. 3 is another schematic side-view illustration of a vehicle having a vehicle-body accessory or protrusion, a trunk rack, and a vehicle-body-accessory spanning member according to the present disclosure, the rack and spanning member schematically shown installed on the vehicle.

FIG. 4 is another schematic side-view illustration of a vehicle having a vehicle-body accessory or protrusion, a trunk rack, and a vehicle-body-accessory spanning member according to the present disclosure, the rack and spanning member schematically shown installed on the vehicle.

FIGS. 5-7 are somewhat less schematic illustrations of the configurations of vehicle, trunk racks, and spanning members of FIGS. 2-4.

FIG. 8 is an isometric view of a portion of a vehicle having a spoiler adjacent the top portion of its rear door and three separate spanning members according to the present disclosure corresponding to the schematic illustrations of FIGS. 2-4 and FIGS. 5-7, respectively.

FIG. 9 is an isometric view of two spanning members according to the present disclosure shown secured together with a cross-bar, the pair of spanning members secured to a MINI COOPER.

FIG. 10 is a side view of one of the spanning members of FIG. 9 shown secured to the MINI COOPER.

FIG. 11 is an isometric view of two spanning members according to the present disclosure shown secured together with a cross-bar, the pair of spanning members secured to a MINI COOPER.

FIG. 12 is a side view of one of the spanning members of FIG. 11 shown secured to the MINI COOPER.

FIG. 13 is an isometric view of a strap with glass hatch securement members that may be used with the spanning members of FIG. 11 and bike racks according to the present disclosure.

FIGS. 14A-F illustrate non-exclusive examples of spanning members according to the present disclosure.

DETAILED DESCRIPTION

Figure 14B:
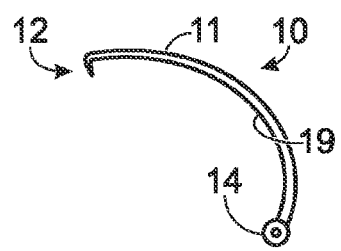
Figure 14C:
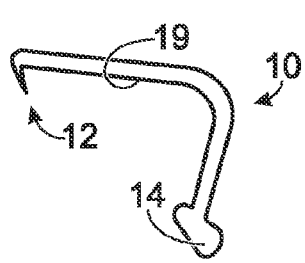
Figure 14D:
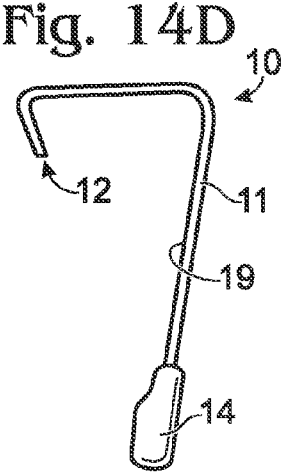

Vehicle-body-accessory spanning members of a rack strap extension system according to the present disclosure for use with trunk racks are schematically illustrated in FIG. 1 and generally indicated at 10. As illustrated, spanning members 10 may include a body 11 and two end portions 12, 14. Body 11 may (but is not required to) include, or be constructed of, a material that allows body 11 to maintain a substantially rigid shape, including in an arcuate shape, such as a rectangular or circular shape, or any shape desired. Such materials may include a metal, a substantially rigid foam or rubber, or any material so desired. It will be appreciated that spanning members 10 can either be a fixed shape or can be adjustable. For example, body 11 may be configured so that the distance between end portions 12 and 14 can be lengthened or shortened as desired. Such a configuration can be achieved using a sliding pair of members as body 11 that can be latched, stopped, or locked at the desired distance between end portions 12 and 14.

End portions 12, 14 may take a variety of forms and may be configured to engage a surface or other portion of a corresponding vehicle. For example, an end portion of a spanning member may be configured to engage the outer surface of a window, door, roof, or other vehicle body portion. In such embodiments, the end portion may (but is not required to) include, or be constructed of, a material that generally prevents the spanning member from slipping on the vehicle body portion, such as a frictional material (e.g., rubber, plastic). Additionally or alternatively, an end portion of a spanning member may be configured to engage a crevice, seam, or other generally three-dimensional aspect of a vehicle body. For example, an end portion may be configured to engage a seam between a vehicle door or window and an adjacent portion of the vehicle's body. A non-exclusive example of such an end portion may take the form of a hook. Spanning members according to the present disclosure may include end portions that are configured differently. For example, a spanning member may include a first end portion 12 configured to engage a seam of a vehicle body and a second end portion 14 configured to engage the outer surface of a rear window of a vehicle. Other configurations are equally within the scope of the present disclosure.

Spanning members according to the present disclosure may be described as having an outward-facing or routing surface 16 and an inward-facing surface 17. When a spanning member is installed on a corresponding vehicle, the outward-facing surface will generally face away from the vehicle's body while the inward-facing surface will generally face toward the vehicle's body. The contour of the spanning member creates a cavity 19, which conforms to the shape of inward-facing surface 17. As an illustrative non-exclusive example, the contour of cavity 19 may have an arcuate shape, such as a rectangular or circular shape, or any shape desired. The shape or contour of cavity 19 may be configured to create space for insertion of a vehicle body accessory or protrusion into the cavity, in such a manner that ends portions 12, 14 can still be engaged to the vehicle.

As mentioned above, trunk racks are generally secured to a corresponding vehicle using straps, or webbing, that are tensioned. Spanning members 10 are therefore provided to engage the straps of a corresponding trunk rack and route the straps around a vehicle-body accessory that otherwise may be damaged due to excessive forces, as discussed above. The tension to secure the rack, strap, and/or spanning member to the vehicle can be achieved in a variety of ways using a variety of securement structures or connector mechanisms. For example, a first connector piece, such as a male member, that is proximate the strap and spanning member, and mated to a second connector piece, such as a receiver or female piece, of the vehicle, can be used to secure the spanning member, strap, and/or rack to the vehicle as desired. Illustrative, non-exclusive examples of connector mechanisms and securement structures include a hook or latch and catch mechanism, a buckle, a ladder-lock mechanism, and/or a glass hatch mechanism, any or a combination of which can be used as desired. It is appreciated that the male connector may be connected to either the strap or spanning member and mated to a female receiver of the vehicle, or vice-versa.

In some embodiments, surface 16 may directly engage a corresponding strap. Additionally or alternatively, as illustrated in dashed lines, spanning members may (but are not required to) include one or more channels 18 for receiving and engaging a corresponding strap. For example, a spanning member may include a channel 20 extending along at least a portion of surface 16. Additionally or alternatively, a spanning member may include a channel 22 extending through a portion of the spanning member and having openings 24, 26 provided on surface 16 of the spanning member. Additionally or alternatively, a spanning member may include a channel 28 extending through a portion of the spanning member and having an opening 30 on outward-facing surface 16 and an opening 32 on inward-facing surface 17. Other configurations are equally within the scope of the present disclosure.

Additionally or alternatively, as schematically illustrated at 34, spanning members according to the present disclosure may include a strap securement mechanism configured to engage a strap or webbing, which may be the same as, or different from, the connector mechanism described above. For example, a spanning member may have a ladder-lock mechanism or other structure configured to secure an end, or a portion of, a length of strap or webbing. Such structure may include the ability to adjust the strap or webbing, for example, to tension the strap or webbing after the spanning member and corresponding rack have been appropriately positioned on a vehicle. Additionally or alternatively, the spanning member may include a coupling mechanism configured to cooperate with a corresponding mechanism attached to a length of strap or webbing. For example, a side-release buckle may be used. Other configurations of securing a length of strap or webbing to a spanning member are equally within the scope of the present disclosure. It is also appreciated that any of these mechanisms could also be used as the connector mechanism or securement structure, as described above, and vice-versa.

FIG. 2 schematically illustrates a non-exclusive example 100 of a spanning member 10 installed on a vehicle 50 in conjunction with a corresponding trunk rack 52. Vehicle 50 includes a first securement structure or connector mechanism 54 and a second securement structure or connector mechanism 56. The securement structures or connector mechanisms 54, 56 may take a variety of forms depending on the particular vehicle 50 being used. For example, the securement structures or connector mechanisms may be a hook that engages a seam between a trunk or rear door and an adjacent potion of the vehicle's body, a seam between a hinged window and an adjacent portion of a vehicle's body, or another part of a vehicle body such as (but not limited to) an edge of a bumper, or a catch of the vehicle. Both securement structures or connector mechanisms are not required to be of the same type, and more than two securement structures or connector mechanisms may be used to secure a rack to a vehicle.

In the non-exclusive embodiment of spanning member 100, two lengths of straps 58, 60 are illustrated, although additional straps or other securing mechanisms may additionally be used. It is understood that the term "strap" is intended to include straps, bungee cords, rope, tweed, webbing or any other material that can secure a rack and/or spanning member to a vehicle. As illustrated, spanning member 100 is configured to span or otherwise extend over or around a vehicle-body accessory or protrusion 62. A first length of strap 58 is shown extending from the bike rack 52 around and engaging the spanning member 100 and secured to first securement structure or connector mechanism 54 of vehicle 50. A second length of strap 60 is shown extending from the bike rack 52 to second securement structure or connector mechanism 56 of vehicle 50.

FIG. 3 schematically illustrates another non-exclusive example 200 of a spanning member 10 installed on a vehicle 50. As illustrated, spanning member 200 is configured to span or otherwise extend over or around a vehicle-body accessory or protrusion 62. In this embodiment, spanning member 200 includes an end portion 12 configured to engage securement structure or connector mechanism 54 of vehicle 50. In such an embodiment, a first length of strap 58 may be secured to spanning member 200. Additionally or alternatively, the length of strap 58 may also engage a securement structure or connector mechanism of the vehicle in addition to the end portion of the spanning member.

FIG. 4 schematically illustrates another non-exclusive example 300 of a spanning member 10 installed on a vehicle 50. As illustrated, spanning member 300 is configured to span or otherwise extend over or around a vehicle-body accessory or protrusion 62. In this embodiment, spanning member 300 further extends over the securement structure or connector mechanism 54, so that its end portion 12 engages a surface of the vehicle's body, such as (but not limited to) the roof of the vehicle. In such an embodiment, the spanning member 300 may be configured so that the first length of strap 58 extends through the spanning member (for example, as discussed above in reference to FIG. 1 and illustrated by channel 28), and secured to first securement structure or connector mechanism 54.

FIGS. 5-7 somewhat less schematically illustrate the embodiments 100, 200, 300 of FIGS. 2-4.

FIG. 8 further illustrates non-exclusive examples of spanning members 100, 200, 300 secured to a vehicle 50 having a body accessory or protrusion 62 and a first securement structure or connector mechanism 54 engaged in a crack or seam 83 between a rear door or hatch 85 and an adjacent portion of the vehicle's body.

FIG. 9 illustrates a pair of spanning members 10 secured together with a cross-bar 70 and secured to a MINI COOPER. Accordingly, more than one spanning member 10 may be used without having to independently position each spanning member during installation. Any number of spanning members may be used depending on a particular configuration of rack or vehicle being used, and the present disclosure is not limited to the use of one or two spanning members.

FIG. 10 illustrates a side view of one of the spanning members of FIG. 9. As shown, the illustrated spanning member is in the form of a spanning member 200 having an end portion 12 with a connector mechanism 54 in the form of a hook that is secured to the crack or seam formed between the rear door of the vehicle and the vehicle's roof.

FIG. 11 illustrates a pair of spanning members 300 secured together with a cross-bar 70. As discussed above, spanning members 300 may include a channel for the straps to extend through and thereby permit securement of the straps to the vehicle. In this example, the straps incorporate glass hatch hooks, discussed in more detail below. FIG. 12 is a side view of the spanning members 300 of FIG. 11. As mentioned above, various methods of attaching a strap associated with a bike rack to a vehicle using a connector mechanism or securement structure may be used. A non-exclusive example of one such mechanism or structure that may be used may be described as a glass hatch hook 80. FIG. 13 illustrates a non-exclusive example of a hook 80. As shown, the hook may include a pair of soft (e.g., constructed of foam) cylindrical members 82 secured to a bar 84 extending perpendicular to the length of associated strap at the strap's end.

Referring to FIGS. 11 and 12, the embodiment of hook 80 may be installed by opening the rear door or hatch 85 of the vehicle, and positioning cylindrical members 82 and bar 84 within an inside cavity 86 of the vehicle and positioning a portion of strap 58 through the crack or seam 83 of the vehicle between the rear door or hatch 85 and inside cavity 86. Once rear door or hatch 85 is closed, the strap (or pair of straps) can be pulled from the outside of the vehicle to seat and secure cylindrical members 82 and bar 84 within inside cavity 86. The strap can then be coupled to a rack and a spanning member, as described above, such that cylindrical members 82 and bar 84 may anchor and secure the spanning member (or pair of spanning members), strap, and/or trunk rack to the vehicle. For example, a buckle, a ladder lock, or other securement structure or connector mechanism, such as the ones herein described, may be employed with the strap to maintain the desired tension of the strap to so secure the spanning member, strap, and/or trunk rack to the vehicle.

FIGS. 14A-F illustrate additional non-exclusive examples of spanning members according to the present disclosure.

Figure 14E:
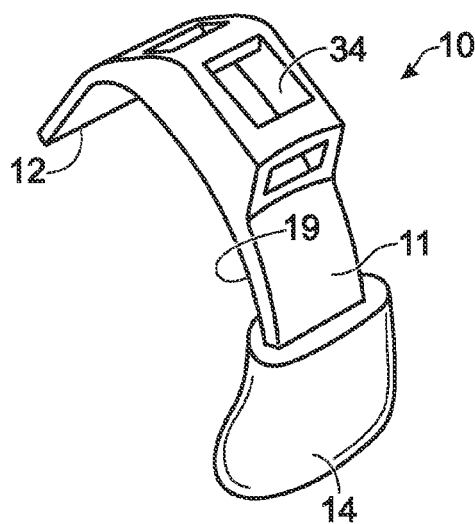
Figure 14F:
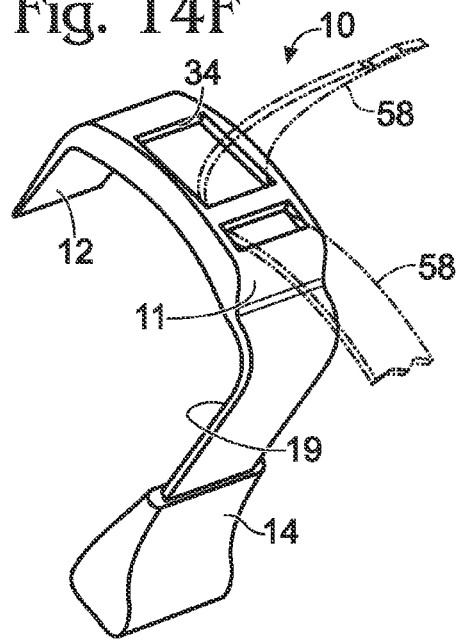

FIGS. 14E and 14F illustrate additional non-exclusive examples of spanning members that have a mechanism 34 configured to engage an associated strap.

Figure 15A:
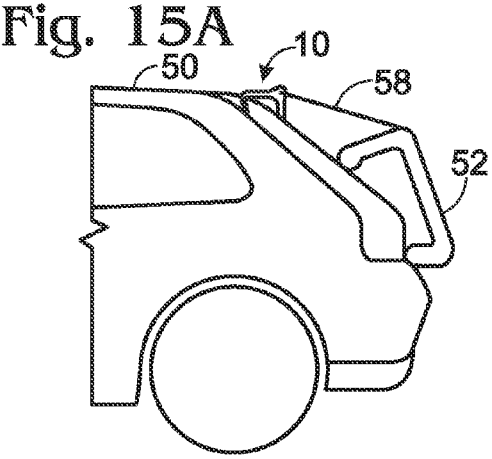
FIGS. 15A-B illustrate spanning members and bike racks according to the present disclosure secured to a hatchback vehicle.
Figure 15B:
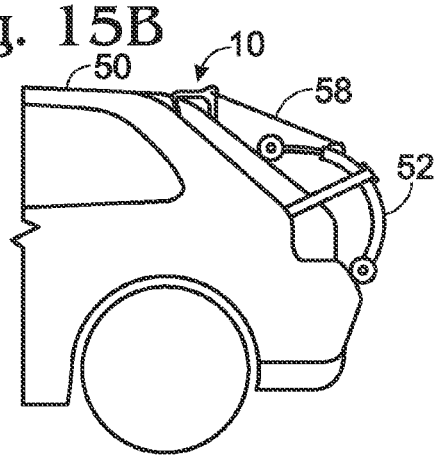

FIGS. 15A and 15B illustrate additional non-exclusive examples of spanning members and bike racks according to the present disclosure secured to a hatchback vehicle.

It is further appreciated that the spanning members of the present disclosure can be adopted for other uses beyond securing a trunk rack to the rear end of a vehicle. The spanning members can generally be used in association with straps to avoid damage to any structure that is desired to be protected against damage by tensioned straps, on a vehicle or otherwise. For example, the spanning members of the present disclosure could be used in association with straps securing objects to the roof of the vehicle to avoid damaging a rear spoiler or fin, such as the ones described herein. The spanning members could be positioned along or near the roof area adjacent either the passenger or driver side of the vehicle to protect non-structural accessories or protrusions (perhaps a rain shield located over the windows) from damage when using straps to secure objects to the roof of the vehicle. The spanning members could also be positioned in association with securing a strap to the bottom of a vehicle (such as strap 60 in FIGS. 2-7) to avoid damaging a vehicle accessory or protrusion located near the bottom of a vehicle (perhaps ground effects).

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and nonobvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

We claim:

1. A rack system for a vehicle including a vehicle body forming an edge, the vehicle also including a body accessory forming a protrusion on the vehicle body, the rack system comprising:
    a trunk rack including a frame having a plurality of contact members configured to engage a rear end of the vehicle body;
    a strap connected to and extending from the frame; and
    a spanning member that is substantially rigid and distinct from the frame and configured to span the protrusion and engage the vehicle body on opposing sides of the protrusion and to engage and support the strap in a spaced relation to the protrusion,
    wherein the strap and the spanning member collectively are configured to engage the edge of the vehicle body and form a connection between the frame and the vehicle, such that the strap assembly can be tensioned without applying pressure to the protrusion.

2. The rack system of claim 1, wherein the strap includes a hook configured to engage the edge of the vehicle body.

3. The rack system of claim 1, wherein the spanning member includes a hook configured to engage the edge of the vehicle body.

4. The rack system of claim 1, wherein an end portion of the strap is configured to extend through a gap formed between a roof and a door or window of the vehicle body, and into a passenger compartment of the vehicle, and to restrict removal of the end portion from the passenger compartment when the door or window is closed.

5. The rack system of claim 1, wherein the edge bounds a portion of a gap defined by the vehicle body, wherein the spanning member has a first end portion and a second end portion configured to contact the vehicle body on respective opposite sides of the gap, and wherein the spanning member defines a channel configured to guide the strap toward the gap.

6. The rack system of claim 5, wherein the spanning member defines an opening opposingly flanked by the first end portion and the second end portion, and wherein the channel communicates with the opening.

7. The rack system of claim 1, wherein the spanning member includes a buckle configured to receive the strap.

8. The rack system of claim 1, wherein the spanning member is generally C-shaped.

9. A rack system for a vehicle including a vehicle body having an edge formed by a door, window, or trunk of the vehicle body, the vehicle also including a body accessory forming a protrusion on the vehicle body, the rack system comprising:
    a trunk rack including a frame having an arm to support a bicycle and a plurality of contact members configured to engage a rear end of the vehicle body; and
    a strap connected to and extending from the frame and configured to extend over the protrusion and into engagement with the edge of the vehicle body to form a connection between the trunk rack and the vehicle; and
    a spanning member that is substantially rigid and distinct from the frame and configured to span the protrusion while contacting the vehicle body on opposing sides of the protrusion and to guide the strap over the protrusion, such that the strap can be tensioned without applying pressure to the protrusion.

10. The rack system of claim 9, wherein the strap includes a hook configured to engage the edge of the vehicle body.

11. The rack system of claim 9, wherein an end portion of the strap is configured to extend through a gap formed between a roof and a door or window of the vehicle body, and into a passenger compartment of the vehicle, and to restrict removal of the end portion from the passenger compartment when the door or window is closed.

12. The rack system of claim 9, wherein the spanning member has a first end portion and a second end portion configured to contact the vehicle body on opposite sides of a gap of the vehicle body that is partially bounded by the edge, and wherein the spanning member defines a channel configured to guide the strap toward the gap.

13. The rack system of claim 12, wherein the spanning member defines an opening opposingly flanked by the first end portion and the second end portion, and wherein the channel communicates with the opening.

14. A method of connecting a trunk rack to a vehicle including a vehicle body forming an edge, the vehicle also including a body accessory forming a protrusion on the vehicle body, the method comprising:
    positioning a frame of a trunk rack in engagement with a rear end of the vehicle body;
    forming a connection between the frame and the vehicle with a strap assembly including a strap that extends from the frame and a spanning member that is substantially rigid and distinct from the frame, with the strap assembly extending over the protrusion and into engagement with the edge of the vehicle body, and with the spanning member spanning the protrusion and engaged with the strap and the vehicle body to support the strap in a spaced relation to the protrusion,
    wherein the strap assembly is tensioned without applying pressure to the protrusion.

15. The method of claim 14, wherein the strap includes a hook, and wherein the step of forming a connection includes a step engaging the edge of the vehicle body with the hook.

16. The method of claim 14, wherein the spanning member includes a hook, and wherein the step of forming a connection includes a step engaging the edge of the vehicle body with the hook.

17. The method of claim 14, wherein the step of forming a connection includes a step of placing an end portion of the strap through a gap formed between a roof and a door or window of the vehicle body, and into a passenger compartment of the vehicle, and a step of closing the door or window to restrict removal of the end portion from the passenger compartment.

18. The method of claim 14, wherein the spanning member includes a first end portion and a second end portion, and wherein the step of forming a connection includes a step of disposing the first end portion and the second end portion on the vehicle body adjacent respective opposing sides of the protrusion and with the first end portion generally forward of the edge of the vehicle body.

19. The method of claim 14, wherein the edge is formed by a hatchback door or window of the vehicle body.

* * * * *